Patented Dec. 31, 1929

1,741,921

UNITED STATES PATENT OFFICE

HARRY J. DAVENPORT, OF PATERSON, NEW JERSEY

DEODORIZING AND DEHUMIDIFYING COMPOSITION AND PROCESS OF MAKING SAME

No Drawing.   Application filed October 29, 1927.  Serial No. 229,802.

This invention relates to a new and improved composition of matter for deodorizing and dehumidifying purposes and to a process of producing the same. Various compositions have been proposed for use as deodorizers or for use as dehumidifiers. One of the disadvantageous features of many of these compositions is that they possess characteristic odors of their own and this is objectionable, particularly when they are used in refrigerators and in similar situations where foods or other materials are present that would be rendered unsuitable for use if a foreign odor were acquired.

According to the present invention, a composition is produced which not only is effective as a deodorizer, but also is characterized by its ability to reduce the humidity of the atmosphere to which it is exposed, and combined with these properties it is free from any objectionable counter odor. These properties make the composition particularly desirable for use in refrigerators, ice-boxes and similar receptacles where foods of various kinds are stored together, as well as for use in other situations where it is desired to reduce the moisture content of the atmosphere present, or to eliminate odors, or both.

In preparing a preferred form of the composition I mix the following materials, in a dry form and reduced to a finely divided condition, in approximately the proportions indicated by weight:

| | Per cent |
|---|---|
| Calcined gypsum, or calcium sulphate | 30 |
| Aluminum sulphate | 10 |
| Charcoal | 60 |

The dry mixture thus obtained is then mixed with equal parts by weight of water, the best results being obtained when the temperature of the water is brought to 92° F. or higher. Agitation or stirring of the mixture is continued until a homogeneous mixture is obtained and until the mixture forms a more or less jelly-like mass. This product is then allowed to dry. Preferably the drying operation is permitted to run over a period of a week or ten days at a moderate temperature. If desired, the mixture, when it begins to "jell", may be molded to form a suitably shaped product so that when the drying operation is completed the product is ready for insertion in a perforated cannister or other suitable container for distribution to the trade. When dry the product is of a dark greyish color and possesses a high degree of porosity. It is found that the porosity of the material and hence its deodorizing and dehumidifying properties are greatly improved by carrying out the mixing at or above the temperature indicated. By the use of heated water in the mixing operation not only is the porosity of the product improved, but also its volume is increased and the mixing is facilitated.

It is understood that the proportions of the various constituents of the composition may be varied over a considerable range, although for best results such variations should not exceed 5% to 10% in either direction from the proportions specified. Also, a sulphate of another alkaline earth metal, such as magnesium, may be substituted for gypsum without seriously lowering the deodorizing and dehumidifying properties of the composition.

The product, because of its ability to remain in a molded shape, such, for example, as a cylinder, is conveniently assembled with the containers in which it is distributed to the trade, and also may be used as a refill for such containers. As compared with other deodorizing and dehumidifying compounds, which are in the form of powders or liquids, my new composition, which when dry is in the form of a solid, light and porous mass of any predetermined shape, offers marked advantages as to convenience for use.

It is to be understood that various changes in the process of preparing the composition and in the proportions of the respective constituents may be made without departing from the invention, which is to be deemed as limited only as is indicated by the scope of the appended claims.

What I claim is:

1. A deodorizing and dehumidifying composition consisting predominantly of charcoal, and containing lesser amounts of an alkaline earth sulphate and aluminum sulphate, each being present in substantial and effective amounts.

2. A deodorizing and dehumidifying composition containing the following materials in approximately the porportions specified by weight: calcium sulphate, 30%; aluminum sulphate, 10%; charcoal, 60%.

3. A deodorizing and dehumidifying composition containing approximately 40% of aluminum sulphate and calcium sulphate taken together, each being present in substantial and effective amounts, and about 60% of charcoal.

4. Process of producing a deodorizing and dehumidifying composition comprising mixing charcoal, a sulphate of an alkaline earth metal, aluminum sulphate and water, the mixing operation being carried out at a temperature of 92° F. or higher, and drying the resulting product.

5. As an article of manufacture, a porous body possessing deodorizing and dehumidifying properties and consisting predominantly of charcoal and containing lesser amounts of calcium sulphate and aluminum sulphate, each of said sulphates being present in substantial and effective amounts.

6. Process of producing a deodorizing and dehumidifying composition comprising mixing the following ingredients in substantially the proportions indicated; charcoal 60%; a sulphate of an alkaline earth metal 30%; aluminum sulphate 10%; adding an equal weight of water and mixing the resulting mass while maintaining the temperature at approximately 92° F., or higher, and drying the resulting product.

In testimony whereof, I have signed my name to this specification this fourteenth day of October, 1927.

HARRY J. DAVENPORT.